Oct. 21, 1952  S. C. COCKRELL ET AL  2,614,417
TORQUE MEASURING DEVICE

Filed Oct. 20, 1949   2 SHEETS—SHEET 1

Inventor
S. C. COCKRELL
F. F. GLASGOW
By M. D. Hayes
Attorney

Oct. 21, 1952     S. C. COCKRELL ET AL     2,614,417
TORQUE MEASURING DEVICE

Filed Oct. 20, 1949     2 SHEETS—SHEET 2

Inventor
S. C. COCKRELL
F. F. GLASGOW

Patented Oct. 21, 1952

2,614,417

UNITED STATES PATENT OFFICE 2,614,417

TORQUE MEASURING DEVICE

Sanford C. Cockrell, Washington, D. C., and Forrest F. Glasgow, Wilmington, Del.

Application October 20, 1949, Serial No. 122,562

7 Claims. (Cl. 73—137)

(Granted under the act of March 3, 1883, as amended April 30, 1928; 370 O. G. 757)

This invention relates to a method and mechanism for measuring and recording torque such as that required to rotate a shaft or like rotatable object through a series of revolutions.

One object of the present invention is to provide a new and improved apparatus by means of which the torque required to rotate a shaft can be measured and recorded.

A further object is to provide a method and apparatus for measuring and recording the torque applied to a motor driven object in calibrated units by measuring and recording the current supplied to the motor.

Still a further object of the present invention is to provide means for calibrating the current recording device so as to establish reference lines in terms of torque on a recording tape on which the recorded torque measurements are to be taken.

Other objects and many of the attendant advantages of this invention will be readily appreciated as the same becomes better understood by reference to the following detailed description when considered in connection with the accompanying drawings wherein.

Figure 1:
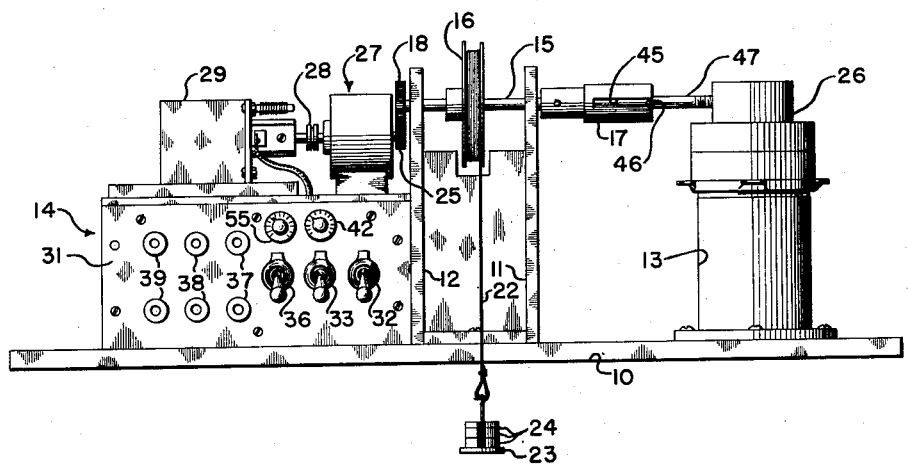
Fig. 1 is a view in elevation of a portion of the torque measuring apparatus.
Figure 4:
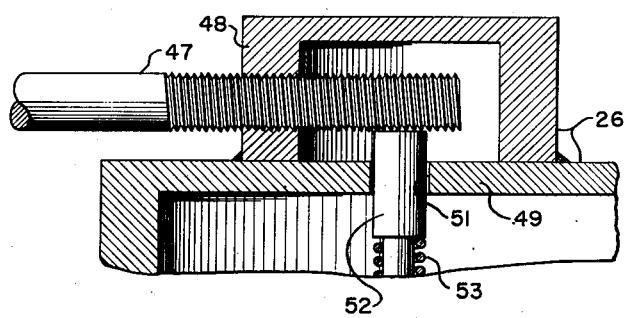
Fig. 4 is a view in section of a fragmentary portion of a nose fuze having an arming screw whose torque is to be measured and recorded by the apparatus of the present invention as the screw is rotated and withdrawn from the fuze housing thereby to arm the fuze.

Referring now to drawings in which like numerals of reference are employed to designate like parts throughout the several views, there is shown in Fig. 1, a base 10 having upstanding vertical walls 11 and 12, an adapter 13 and a housing 14 secured to the base. Journaled in the upstanding walls 11 and 12 is a shaft 15 carrying a calibrating drum 16 of a predetermined measured diameter such, for example, as 2 inches, the drum being secured to the shaft and disposed between the walls. The shaft 15 is provided with a tubular coupling 17 secured on one end of the shaft and a spur gear 18 mounted on the opposite end. Coupling 17 is provided with a longitudinal slot 45 into which is slideably arranged a pin 46 secured to and extending radially from the arming screw 47 of the nose fuze, generally designated 26, which is supported on adapter 13. The arming screw 47 is slideably arranged within the coupling 17 and threadably engages wall portion 48, Fig. 4. Fuze base 49 is provided with a vertical bore 51 into which is slideably arranged piston 52 which is yieldably urged into engagement with arming screw 47 by compression spring 53.

Calibrating drum 16 has a cable 22 wound thereon which carries a weight supporter 23 adapted to receive a number of weights 24 to produce a force of predetermined amount at the circumference of the drum, which force is transmitted through the drum 16 and shaft 15 to produce a torque in gear 18 which is in mesh with gear 25.

In many cases it is desired to know the torque which is required to rotate a rotatable object at a specified velocity. For example, in the case of the aforedescribed impeller operated nose fuze 26 for a bomb or mine, as the case may be, it is desired to know the torque required to rotate the impeller shaft or arming screw 47 at a predetermined velocity whereby the sufficiency of the impeller blades (not shown) to rotate the impeller shaft at this velocity during the free flight of the bomb or mine in actual use may be determined.

To this end the fuze 26 is mounted on adapter 13 which supports the fuze in suitable relation with respect to arming screw 47 such that the motor 29 may make driving connections with the arming screw, as aforedescribed.

Spur gear 25 is mounted on a shaft of a gear reduction mechanism, generally designated 27, which forms a driving connection through coupling 28 with the permanent magnet direct current motor 29. Motor 29 is supported on top of housing 14 which has an electrical panel 31 for mounting a pair of variable resistors 42 and 55, a pair of off-on toggle switches 32 and 33 for connecting batteries 34 and 35 respectively into the operating circuit of Fig. 2 after the batteries have been connected to the panel, a reversing double pole double throw switch 36 for driving the motor in opposite directions, and pairs of plug connections 37, 38, and 39 for connecting batteries 34, 35 and recording ammeter 41 into the circuit of Fig. 2 through panel 31.

Figure 2:
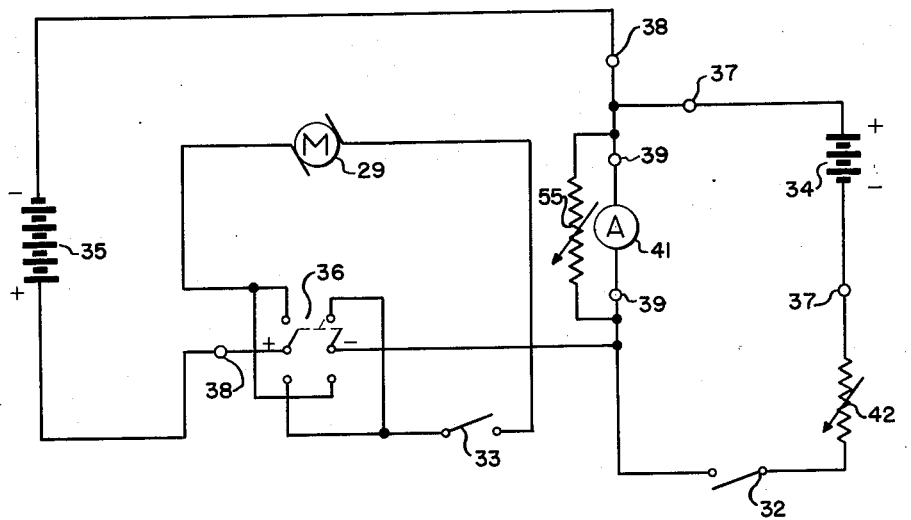
Fig. 2 illustrates in diagrammatic form the complete electrical system of the torque measuring apparatus according to the preferred embodiment of the invention.

Before proceeding with a detailed description of the electrical system shown in Fig. 2, it may be of assistance in the comprehension of the invention to recall that a permanent magnet direct current motor is employed for driving the impeller shaft 47 whose torque is to be measured. In such a motor, the torque on the motor shaft may be expressed mathematically by the equation:

$$T = K\phi I$$

wherein

T is the torque on the motor drive shaft
K is the friction and other losses inherent in the motor and reduction gears and is constant
$\phi$ is the field flux which is constant, and
I is the armature current which varies in proportion to the torque on the drive shaft of the motor.

Figure 3:
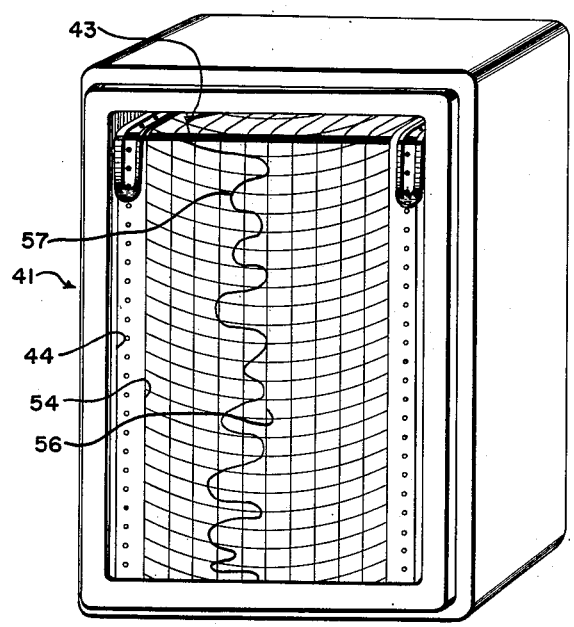
Fig. 3 is a perspective view of the recording ammeter employed in connection with the present invention.

A graphic ammeter 41, such as shown in Fig. 3, is connected in series with the motor and as varying torques are applied to the motor shaft, the current I flowing through the ammeter will vary proportionally as the load on the motor. In order to calibrate the ammeter so as to directly measure the torque such, for example, as inch-ounces, a series of weights 24 such, for example, as 1, 2, 2, and 5 ounces are provided.

The ammeter 41 is calibrated by removing all weights 24 from support 23, disconnecting the arming screw 47 from coupling 17 and closing switches 33 and 36 to operate the motor with no load on coupling 17.

With the motor operating at no load, a current is drawn thereby to provide a torque sufficient to overcome the friction, windage, and other losses of the driving system for shaft 15. This current is indicated by a displacement of the recording pen from the left, border line 54 on the recording tape. It is desirable, however, for "zero" or "no load," that the pen follow border line 54 as a reference line whereby the pen will have the full width of the tape for torque measurement of various objects to be tested within a range of 0 to 10 in.-oz., for example. This is accomplished by means of a compensating circuit including battery 34, variable resistance 42, and switch 32. In the use of the compensating circuit to move the pen to the reference line 54, switch 32 is closed and resistance 42 is adjusted until the current supplied to meter 41 is of zero value thereby to position the pen on the reference line 54.

Assuming that the "no load" losses do not vary when different loads are applied to shaft 15 as by different objects to be tested, to calibrate the tape to inch-ounces, it merely becomes necessary to measure and adjust the current required to provide the torque to elevate one known weight 24 on cable 22 and drum 16. This is accomplished with all weights 24 removed from support 23 and with the arming screw 47 disconnected from coupling 17, as aforementioned. A 5 ounce weight, for example, is then placed on support 23 and the variable resistance 55 is adjusted until the recording pen stops on the line 56 which is the center or fifth line from the reference line 54, and thus indicates a torque of 5 inch-ounces, the drum being of 1 inch radius. The other divisions or lines on the tape, being equally spaced thereon, in like manner, indicate torque units in inch-ounces of 0 to 10 inch-ounces as read from left to right on the tape.

The circuit of Fig. 2 is, in effect, a bridge circuit having motor 29, batteries 34 and 35, and variable resistor 42 as the arms thereof, and having meter 41 and variable resistance 55 as the center leg of the bridge. Thus, when the bridge is balanced by adjustment of resistor 42, no current flows through the meter and the pen is positioned on reference line 54. There is also no current through the variable resistor 55 when the bridge is balanced and hence adjustment of the resistor does not disturb the balance of the bridge. When the bridge is unbalanced as additional current is drawn by the motor to satisfy the torque requirements of the load, or object under test rotated thereby, a current flows in the center leg and is divided between the meter and resistor 55 in accordance with the adjustment of the latter. When the load is removed, the pen is again restored to reference line 54, regardless of a calibrating change in the adjustment of the meter sensitivity adjusting resistor 55, for the aforementioned reason that no current is supplied to the meter when the bridge is balanced.

It will also be understood, of course, that, when desired, the pen may be operated from any other zero reference line merely by operating the bridge circuit with an initial unbalance.

When it is known that different production groups of fuzes should not require operating torques in excess of 3, 7, and 9 inch-ounces, for example, and when it is desired to accurately determine the accept-reject condition of these fuzes, each of the torques 3, 7, and 9 may be calibrated with respect to the tape, by using 3, 7, and 9 ounce weights as in the case of the calibration of the 5 inch-ounces torque aforedescribed, in order to determine the deviation, if any, of the pen from the third, seventh and ninth lines on the recording tape. When there is a deviation, a line corresponding to the true torque value is scribed on the tape. Thereafter, all weights 24 are removed from support 23 and a fuze to be tested is mounted on adapter 13 and the screw shaft 47 thereof connected to coupling 17. With switches 32, 33, and 36 closed, the latter switch being closed in the proper direction to withdraw the arming screw 47, a torque record such as the curve 57 is produced for each fuze tested, curve 57, for example, indicating an acceptable fuze in which the operating torque therefor in no case exceeds the anticipated maximum torque of 5 inch-ounces.

The reversing switch 36 is employed to reverse the direction of rotation of motor 29, and therefore the direction of rotation of shaft 15, whereby the weights 24 and support 23 and shaft 47 may be restored to their initial positions.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States of America is:

1. Apparatus for measuring and recording the torque required to rotate a rotatable object comprising a first battery, a constant field direct current motor having a shaft extend therefrom, a circuit for connecting said motor to said battery for operating said motor, an ammeter in said circuit and having a recording pen adapted to be moved from a null position variably in accordance with the value of current supplied to the motor as the motor operates, a second battery, a variable resistance connected in series with said second battery across said ammeter, said second battery being arranged to apply potential to the ammeter in opposition to the potential applied thereto by said first battery whereby said recording pen is moved to said null position when the resistance is varied to bring said opposing potentials into equality, means detachably mounted on said shaft for applying torques of known value to said motor to calibrate said ammeter, and driving connections from said motor to said rotatable object for applying the torque of the object to the motor whereby the recording pen is moved away from said null position variably in accordance with the current supplied to the motor.

2. In apparatus for measuring and recording the torque required to rotate a shaft, the combination of a first battery, a constant field direct current motor, means for connecting said motor to the shaft to be tested, a circuit for connecting said motor to said battery for operating said motor, an ammeter in said circuit in series with said motor and said battery and having a moving graduated tape and a scribing pen adapted to be moved from a null position variably in accordance with the value of current supplied to the motor as the motor operates, a second battery, a first variable resistance connected in series with said second battery across said ammeter for applying a potential to the ammeter in opposition to the potential applied thereto by said first battery, said first resistance being varied to bring said opposing potentials into equality thereby to restore the pen to said null position, a drum having a predetermined diameter, driving connections from said motor to said drum for rotating said drum when the motor operates, a cable secured to said drum and adapted to be wrapped thereon as the drum is rotated, a weight of predetermined value supported on said cable for applying a torque of predetermined value to the motor whereby the pen is moved away from said null position variably in accordance with the current supplied to the motor and proportional to said predetermined torque value, and a second variable resistance shunted across said ammeter for adjusting the pen to a graduated line on the tape having the same proportion with respect to the number of lines on the tape as the predetermined torque value has to the maximum torque to be recorded on the tape.

3. The method of utilizing a constant field direct current motor to measure the torque required to rotate an object under test comprising the steps of measuring the current required to operate the motor at no load, nulling the measured no load current while maintaining said no load current to the motor, applying a device of known torque to the motor, measuring the value of the current in excess of said nulled current required to operate the motor while the known torque device is applied thereto, removing the known torque device from the motor and coupling said object thereto in lieu thereof, rotating the object by the motor, and measuring the value of the current in excess of said nulled current required to operate the motor with said object coupled thereto whereby said measured excess current values may be compared and the torque required to rotate the object may be measured as a proportional value of said known torque according to the ratio of said current values.

4. The method of measuring and recording the torque required to rotate an object under test comprising the steps of operating a constant field direct current motor at no load, operating a pen recording meter by the no load current of the motor, nulling the current through the meter to restore the pen of the meter to a reference line on the tape of the meter, applying a device of known torque to the motor whereby the operating current thereto is increased above said no load current in proportion to said known torque, operating the meter on said increase in the motor operating current whereby the pen is moved from said reference line to a position at a distance proportional to said torque, scribing a second reference line on the tape corresponding to said moved position of the pen, removing said known torque device from the motor and coupling said object thereto, rotating the object by the motor whereby the operating current thereto is increased above the no load current in proportion to the torque required to rotate the object, and operating the meter on said last named increase in motor operating current whereby the pen is moved from said first named reference line variably in accordance with the torque applied to the motor by said object and the record of the pen on the tape indicates comparatively with respect to said second reference line the torque required to rotate the object as a proportional value of said known torque.

5. The method of comparatively measuring known and unknown torques applied separately to a constant field direct current motor which comprises the steps of operating the motor at no load, operating a current responsive meter by the current required to operate the motor at no load, nulling the no load current through the meter while maintaining the no load current to the motor, operating the meter by the current required to operate the motor with said known torque applied thereto less said no load current, and operating the meter by the current required to operate the motor with said unknown torque applied thereto less said no load current whereby the unknown torque may be measured as a proportional part of the known torque according to the ratio of said measured currents.

6. The method of measuring and recording the torque required to rotate an object under test comprising the steps of operating a motor at no load, operating a pen recording meter by the no load current of the motor, nulling the no load current of the motor through the meter to restore the pen of the meter to a first reference line on the tape of the meter while maintaining the no load current to the motor, applying a device of known torque to the motor whereby the operating current thereto is increased above the no load current of the motor, operating the meter on the increase in motor operating current whereby the pen is moved from said reference line to a position at a distance proportional to said torque, shunting a proportionate part of the increase in motor operating current past said meter whereby the pen is adjusted on said tape into registry with a second reference line thereon spaced from said first reference line a distance corresponding to the known torque of the device, removing the known torque device from the motor and coupling said object thereto, rotating the object by the motor whereby the operating current thereto is increased above the no load current in proportion to the torque required to rotate said object, and operating the meter on the last named increase in operating current whereby the pen is moved from said first named reference line variably in accordance with the torque applied to the motor by said object and the record of the pen on the tape indicates comparatively with respect to said second reference line the torque required to rotate the object as a proportionate value of said known torque.

7. Apparatus for measuring the torque required to operate a device having a rotatable member comprising, in combination, a motor, a shaft extending from said motor and detachably engaging said rotatable member, means mounted on said shaft for producing a torque of known value, first circuit means for energizing said motor, a current measuring device connected in series in said first circuit means, second circuit means having a variable resistor and said current measuring device in series therewith, means for energizing said second circuit means so as to oppose the current flow of said first circuit means through said current measuring device, and adjustable shunt means for said current measuring device whereby the variable resistor is adjustable to null the current required to operate the motor when said rotatable member is disengaged and said torque producing means is inoperative and whereby said shunt means is adjustable to divide the current between the shunt means and the current measuring device when said torque producing means is operative to produce a torque of known value.

SANFORD C. COCKRELL.
FORREST F. GLASGOW.

REFERENCES CITED

The following references are of record in the file of this patent:

UNITED STATES PATENTS

| Number | Name | Date |
| --- | --- | --- |
| 1,449,458 | Sutermeister | Mar. 27, 1923 |
| 1,939,067 | Legg | Dec. 12, 1933 |
| 1,979,340 | Norman | Nov. 6, 1934 |
| 2,269,584 | Eldridge | Jan. 13, 1942 |
| 2,441,608 | Warner | May 18, 1948 |
| 2,511,178 | Roter | June 13, 1950 |
| 2,544,400 | Sourwine | Mar. 6, 1951 |